US011163783B2

(12) United States Patent
Melli et al.

(10) Patent No.: US 11,163,783 B2
(45) Date of Patent: Nov. 2, 2021

(54) AUTO-SELECTION OF HIERARCHICALLY-RELATED NEAR-TERM FORECASTING MODELS

(71) Applicant: OpenGov, Inc., Redwood City, CA (US)

(72) Inventors: Gabor Melli, San Francisco, CA (US); Matthew Seal, Sunnyvale, CA (US)

(73) Assignee: OpenGov, Inc., Redwood City, CA (US)

( * ) Notice: Subject to any disclaimer, the term of this patent is extended or adjusted under 35 U.S.C. 154(b) by 857 days.

(21) Appl. No.: 15/609,499

(22) Filed: May 31, 2017

(65) Prior Publication Data

US 2018/0330261 A1    Nov. 15, 2018

Related U.S. Application Data

(60) Provisional application No. 62/506,321, filed on May 15, 2017.

(51) Int. Cl.

| G06F 16/2458 | (2019.01) |
| G06F 17/18 | (2006.01) |
| G06Q 10/04 | (2012.01) |
| G06Q 40/00 | (2012.01) |

(52) U.S. Cl.
CPC ......... G06F 16/2477 (2019.01); G06F 17/18 (2013.01); G06Q 10/04 (2013.01); G06Q 40/00 (2013.01)

(58) Field of Classification Search
CPC ........ G06Q 10/04; G06Q 40/00; G06F 17/18; G06F 16/2477; G06N 20/00
See application file for complete search history.

(56) References Cited

U.S. PATENT DOCUMENTS

| 8,326,677 B1 * | 12/2012 | Fan .................. G06Q 10/04 705/7.31 |
| 10,558,767 B1 * | 2/2020 | Natarajan .......... H03H 17/0257 |
| 2002/0169657 A1 * | 11/2002 | Singh .................. G06Q 10/06 705/7.31 |
| 2005/0283337 A1 * | 12/2005 | Sayal .................. G06Q 10/00 702/179 |

(Continued)

OTHER PUBLICATIONS

Widodo et al., "Model selection using dimensionality reduction of time series characteristics" (NPL) In: International Symposium on Forecasting, Seoul, South Korea (2013) 46 (Year: 2013).*

*Primary Examiner* — Miranda M Huang
*Assistant Examiner* — Yao D Huang
(74) *Attorney, Agent, or Firm* — Patterson + Sheridan, LLP

(57) ABSTRACT

Techniques are disclosed herein for selecting a predictive model to perform on a set of hierarchical data. A selection of first time series data representing activity observed in a current period in a first hierarchy is received. Second time series data representing activity observed in a prior period in the first hierarchy is retrieved. Predictive models are performed using the second time series data as input, where each predictive model generates statistical outcomes for the current period. A score is generated in each of the plurality of predictive models based on a comparison of the statistical outcomes with the first time series data. Each of the predictive models is ranked based on the generated scores.

20 Claims, 5 Drawing Sheets

(56) References Cited

U.S. PATENT DOCUMENTS

| | | | |
|---|---|---|---|
| 2012/0284212 A1* | 11/2012 | Lin | G06N 20/00 |
| | | | 706/12 |
| 2013/0024160 A1* | 1/2013 | Mihaylov | G06Q 10/06 |
| | | | 702/185 |
| 2015/0081398 A1* | 3/2015 | Dorai | G06Q 10/06375 |
| | | | 705/7.37 |
| 2017/0185904 A1* | 6/2017 | Padmanabhan | G06F 16/00 |
| 2018/0060738 A1* | 3/2018 | Achin | G06Q 30/0201 |
| 2018/0300737 A1* | 10/2018 | Bledsoe | G06Q 30/0202 |

\* cited by examiner

AUTO-SELECTION OF HIERARCHICALLY-RELATED NEAR-TERM FORECASTING MODELS

CROSS-REFERENCE TO RELATED APPLICATIONS

This application claims benefit of U.S. Provisional Patent Application Ser. No. 62/506,321, filed May 15, 2017, of which is incorporated herein by reference in its entirety.

BACKGROUND

Field

Embodiments of the present disclosure generally relate to techniques for selecting a suitable predictive model for hierarchically-related time series data.

Description of the Related Art

Predictive modeling refers to techniques for forecasting outcomes given statistical data. Predictive models have useful applications in various settings. For example, municipal governments may forecast expenditures over a specified period in the future, e.g., such as within the next year, next five years, next ten years, and so on. To generate statistical outcomes in such a scenario, the predictive model receives observed time series data as input, which might comprise expenditures by the municipal government plotted out across a specified amount of previous units of time. The predictive model then evaluates the input, e.g., by performing some descriptive analysis on the input to identify features and outliers in the input, imputing the data, modeling the data, and estimating future performance based on the modeled data. The forecast data may assist the municipal government in making budgetary decisions for an upcoming fiscal period.

A variety of complex predictive models are capable of analyzing time series data. For instance, exponential models may be used to identify exponential growth trends and seasonality in the time series data, e.g., in population. Another example is autoregressive integrated moving average (ARIMA)-based models, which describe autocorrelations in the time series data. One consequence of the complexity and the variety of existing models is that choosing an appropriate model for a given set of time series data presents a challenge. In particular, given a set of time series data, some models may yield more accurate forecasts than others. Typically, users of time series data often do not have extensive background knowledge to discern between potential paths and insights that different predictive models may provide. Because the statistical outcomes generated by forecasting models are used to drive decisions, it is important that an appropriate forecasting model is chosen for a given set of time series data.

SUMMARY

One embodiment presented herein discloses a method for selecting a predictive model to perform on a set of hierarchical data. The method generally includes receiving, by execution of one or more processors, a selection of first time series data. The first time series data represents activity observed in a current period in a first hierarchy. The method also includes retrieving second time series data. The second time series data represents activity observed in at least a prior period in the first hierarchy. A plurality of predictive models is performed using the second time series data as input, each predictive model generating statistical outcomes for the current period. A score is generated in each of the plurality of predictive models based on a comparison of the statistical outcomes with the first time series data. Each of the predictive models is ranked based on the generated score in each of the plurality of predictive models.

Another embodiment presented herein discloses a computer-readable storage medium storing instructions, which, when executed on a processor, performs an operation for selecting a predictive model to perform on a set of hierarchical data. The operation itself generally includes receiving, by execution of one or more processors, a selection of first time series data. The first time series data represents activity observed in a current period in a first hierarchy. The operation also includes retrieving second time series data. The second time series data represents activity observed in at least a prior period in the first hierarchy. A plurality of predictive models is performed using the second time series data as input, each predictive model generating statistical outcomes for the current period. A score is generated in each of the plurality of predictive models based on a comparison of the statistical outcomes with the first time series data. Each of the predictive models is ranked based on the generated score in each of the plurality of predictive models.

Yet another embodiment presented herein discloses a system. The system has a processor and a memory. The memory stores program code, which, when executed on the processor, performs an operation for selecting a predictive model to perform on a set of hierarchical data. The operation itself generally includes receiving, by execution of one or more processors, a selection of first time series data. The first time series data represents activity observed in a current period in a first hierarchy. The operation also includes retrieving second time series data. The second time series data represents activity observed in at least a prior period in the first hierarchy. A plurality of predictive models is performed using the second time series data as input, each predictive model generating statistical outcomes for the current period. A score is generated in each of the plurality of predictive models based on a comparison of the statistical outcomes with the first time series data. Each of the predictive models is ranked based on the generated score in each of the plurality of predictive models.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. Elements and features of one embodiment may be beneficially incorporated in other embodiments without further recitation.

DETAILED DESCRIPTION

Figure 1:
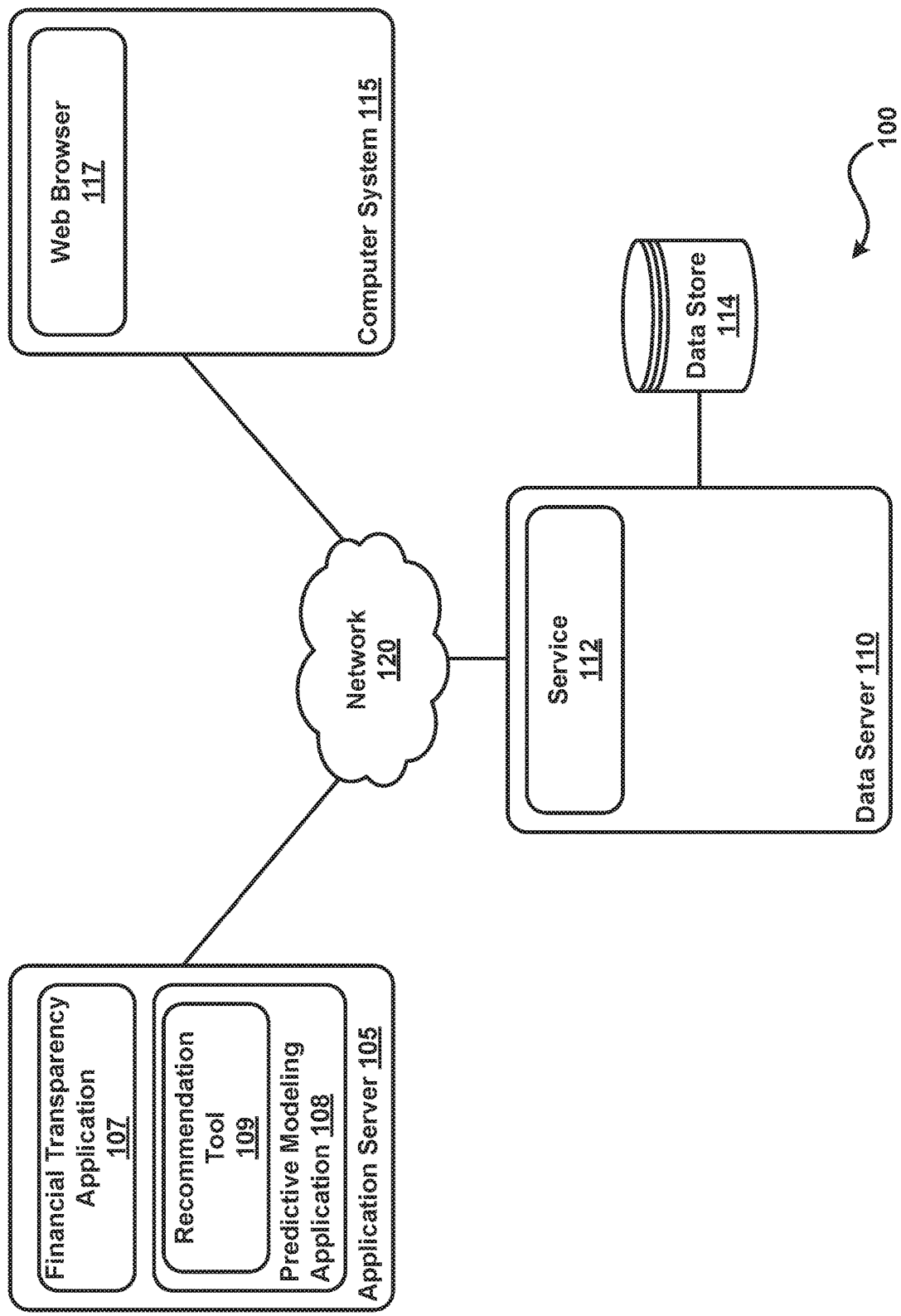
FIG. 1 illustrates an example computer environment, according to one embodiment.

Numerous predictive modeling techniques are available for generating statistical outcomes for time series data. However, selecting an appropriate predictive model to forecast such outcomes can be a challenge, particularly given specific time series data. The selection for an appropriate predictive model is further complicated by time series data that can be organized hierarchically. That is, some sets of time series data in a given hierarchy may receive more accurate results from a model that yields less accurate results to other sets of time series data in an adjacent hierarchy.

As an example, a chart of accounts associated with a municipal government may be organized hierarchically. Specifically, the chart of accounts may be divided into different funds, such as governmental funds, proprietary funds, and fiduciary funds. Each fund category itself may also be divided into smaller hierarchies. For example, the governmental fund category may include general funds, special revenue funds, capital projects funds, and so on. Further, a given fund has typically has a general structure comprising, e.g., fund, account, and object code.

The dimensions of hierarchy associated with the chart of accounts add to the complexity of selecting an appropriate model for a desired hierarchy to analyze. For instance, an autoregressive integrated moving average (ARIMA)-based model may be suitable for forecasting expenditures of the Police Department account for the next five years. But even then, a number of ARIMA-based models exist, such as multiple regression models, moving average models, etc. Because the methods provided by each model vary from one another, the results and insights provided by each may vary significantly. In addition, restructuring of certain departments over certain years may also affect how the data is analyzed through a single model, which can render a given model to be not as accurate after the restructuring.

Embodiments presented herein describe techniques for selecting an optimal predictive model to perform on a hierarchically-related set of time series data. More particularly, embodiments provide a machine-driven approach to selecting the model by projecting time series data from past periods through available models and analyzing the results produced in each model, e.g., by scoring the results based on how accurately the results match to time series data corresponding to observed outcomes in the following periods. The approach may rank the models based on score and apply the model to the input set of time series data.

For example, embodiments may be adapted to a predictive modeling application that forecasts statistical outcomes from input time series data that corresponds to budgetary data of municipal governments. The time series data may be structured hierarchically, e.g., as described above. The predictive modeling application may incorporate a variety of functions corresponding to various modeling techniques, such as exponential models, ARIMA-based models, and others. In one embodiment, the predictive modeling application includes a recommendation tool used to select a predictive modeling technique likely to generate accurate results (compared to other available techniques).

For instance, assume that a user, e.g., an administrator in a finance department for a city government, would like to obtain a forecast for expenditures in the city Police Department over the next five years. In such a case, the predictive modeling application receives a request specifying the Police Department and the specified time period for forecasting (here, five years). The recommendation tool identifies the dimension of time series data associated with the Police Department. The recommendation tool then obtains time series events associated with the Police Department in previous periods. The recommendation tool may perform each of the available predictive modeling techniques on the previous periods. Each model may provide results for the following period(s), which have actual observed time series data associated with them. The recommendation tool then compares the results generated from each model with the actual observed time series data. Doing so allows the recommendation tool to score each model based on the accuracy of the results compared to the observed time series data, e.g., based on root mean square error (RMSE) scoring. Once scored, the recommendation tool ranks the models based on score, e.g., using ranking techniques such as root mean square error.

The recommendation tool may then automatically select a model to apply to current time series data for generating the requested forecast. The recommendation tool may thereafter perform the corresponding modeling technique. In one embodiment, the recommendation tool may also present (e.g., via a graphical user interface accessible by the user) the selected model to the user for confirmation prior to performing the modeling technique. In addition, the recommendation tool generates insights for each evaluated model to present alongside the selected model to allow the user to decide which modeling technique is actually performed. Insights can include graphs detailing the statistical outcomes generated by each model as well as any identified model outliers. The insights may also include deviations in the outcomes against the observed time series data.

Advantageously, embodiments presented herein disclose an approach for automatically selecting an optimal model for a set of hierarchically-related time series data. This approach identifies hierarchical subsets within time series data and evaluates each hierarchy independently of one another, such that an appropriate model is selected for each hierarchy. As a result, statistical outcomes may be more accurately generated for each hierarchical subset of time series data. Further, this approach provides insights as to how a given model was selected for a particular set of time series data. Insights allow a user to make an informed decision as to whether to perform the selected model or some other model, without requiring additional expertise on the part of the user on the underlying models. Therefore, the approach lowers the boundary for a user to successfully analyze trends identified by a model. Further, executing the selected predictive model on a current set of series data improves performance of the modeling system by performing the optimal predictive model on the current data, rather than having to perform trial and error runs using various models.

Note, the following uses a predictive modeling application that forecasts statistical outcomes for budgetary data of local and municipal governments as a reference example of hierarchically structured time series data. Of course, one of skill in the art will recognize that embodiments disclosed herein may be adapted to a variety of hierarchically-related time series data. For example, the predictive modeling application may analyze time series data corresponding to data associated with departments of a business organization (e.g., data corresponding to spending, units of production, employee growth, etc.) and select an optimal model to run on time series data of any given department within the business organization.

FIG. 1 illustrates an example computer environment 100, according to one embodiment. As shown, the computer environment 100 includes an application server 105, a data server 110, and a computer system 115, each interconnected via a network 120 (e.g., the Internet, a local area network, enterprise network, etc.). In one embodiment, each of the application server 105, data server 110, and computer system 115 are representative of a physical computing system (e.g., a desktop computer, laptop computer, mobile device, workstation, etc.) or a virtual computing instance executing in the cloud. Further, although FIG. 1 depicts the configuration of software components as executing on separate servers, the components may all reside on one system (e.g., as a single application, as multiple applications, etc.).

As shown, the application server 105 includes a financial transparency application 107 and a predictive modeling application 109. In one embodiment, the financial transparency application 107 allows a user to evaluate financial and budgetary data for municipal governments. For example, the financial transparency application 107 may provide a graphical user interface through a web portal (not shown) that is accessible by a user (such as an administrator, city planner, citizen), e.g., via a web browser 117 executing on the computer system 115. The budgetary data itself may be scraped from public sources (e.g., charts of accounts, websites of city governments, online encyclopedias, etc.) and processed.

Further, the financial transparency application 107 may identify hierarchies in the retrieved data, such as departmental information, account information associated with each department, relationships between departments and funds, and the like. Further still, the financial transparency application 107 identifies time series events in the each hierarchy corresponding to some budget-related activity, e.g., an expenditure performed on a fund account at a certain time. Once identified, the financial transparency application 107 also identifies other contextual information in the time series data. For example, the time series data may include metadata describing domain-specific knowledge about the nature of the data involved. Domain-specific knowledge may describe certain characteristics of the time series data that may differ from time series data in other hierarchies, such as how often events may transpire for a given department, how the department funds are structured hierarchically, and the like. The financial transparency application 107 may transmit the processed time series data to a data service 112 executing on the data server 110. The data service 112 may maintain the time series data in a data store 114. For example, the time series data may be formatted in a markup language file (e.g., XML, JSON, etc.) or as spreadsheet data.

In one embodiment, the predictive modeling application 108 forecasts statistical outcomes of the time series data for the financial transparency application 107. The predictive modeling application 108 includes functions corresponding to a variety of modeling techniques, such as exponential models, random walk models, and autoregressive integrated moving average (ARIMA) models. The predictive modeling application 108 provides a graphical user interface that allows a user to select a given set of time series data (e.g., as a particular department, fund, or other) and an amount of time for forecasting. Further, the predictive modeling application 108 allows the user to choose from a number of modeling techniques to perform on the selected time series data.

For example, the user may want to evaluate near-term trends of budgetary spending in the Water Treatment department. The user may specify the Water Treatment department as well as an amount of time in the future to forecast outcomes from historical time series data associated with the Water Treatment department. The user may also specify a model to use on the time series data. Generally, a user would want to select a predictive model that produces reasonable results for that time series data, though, as stated, because hierarchically-related data differs from hierarchy to hierarchy, deciding an appropriate predictive modeling technique requires some expertise in the models.

As further described below, the predictive modeling application 108 may also automatically select an appropriate modeling technique to perform on time series data. To do so, the predictive modeling application 108 includes a recommendation tool 109 that evaluates time series data (and contextual information related to the data) corresponding to prior periods of the requested subset of time series data. In one embodiment, the recommendation tool 109 performs each model on prior periods of time series data and scores the model based on how accurately the model forecasts outcomes when compared against observed time series data corresponding to the forecasted periods. In one embodiment, the recommendation tool 109 is a plugin to the predictive modeling application 108 that may execute independently from the predictive modeling application 108 on the application server 105 or some other computing system. In other embodiments, the recommendation tool 109 is a component of the predictive modeling application 108.

Figure 2:
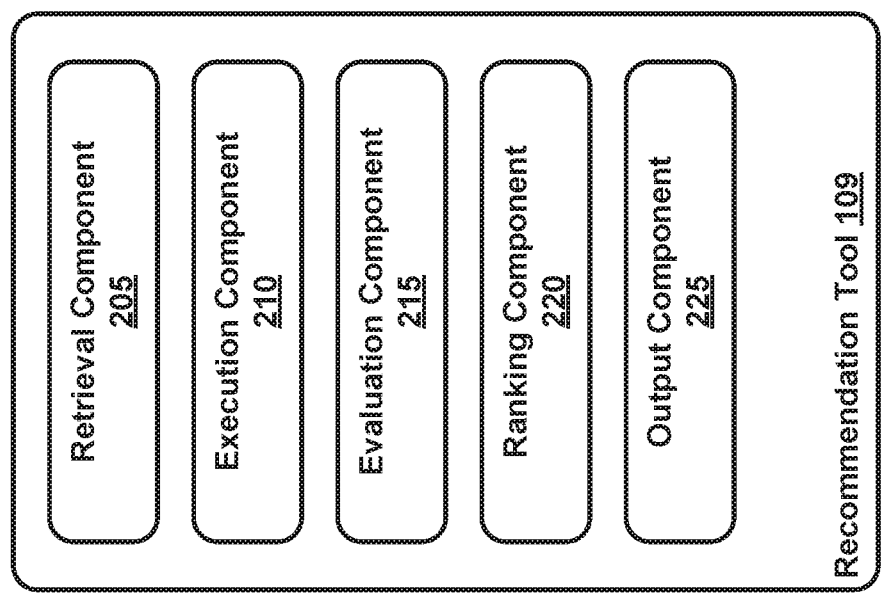
FIG. 2 further illustrates the recommendation tool described relative to FIG. 1, according to one embodiment.

FIG. 2 further illustrates the recommendation tool 109, according to one embodiment. In particular, FIG. 2 presents a conceptual diagram of the process steps performed by the recommendation tool 109. One of skill in the art will recognize that the actual allocation of process steps in practice may vary substantially from this illustration. As shown, the recommendation tool 109 includes a retrieval component 205, an execution component 210, an evaluation component 215, a scoring component 220, a ranking component 225, and an output component 230.

The retrieval component 205 obtains requests sent to the predictive modeling application 108, such as requests submitted by a user to forecast trends and outcomes for a particular subset of time series data for a hierarchically structured data set. For example, the predictive modeling application 108 may provide an application programming interface (API) that allows the retrieval component 205 to communicate with the application 108 and retrieve such requests. The predictive modeling application 108 may also be configured to send requests to the recommendation tool 109.

In one embodiment, the request includes a specification of a hierarchical label, such as a department or fund name (e.g., "Water Treatment"), or an account or object code associated with the department or fund name. In addition, the request can include a specification for an amount of time for forecasting outcomes by a predictive model.

The retrieval component 205 may obtain time series data corresponding to the requested hierarchy. To do so, the retrieval component 205 may query the data service 112 for the time series data and any metadata associated with the time series data. The metadata may include information describing the hierarchy and any indications of outliers impacting the time series data (e.g., restructuring within the hierarchy, events affecting spending for a given period, etc.). The time series data retrieved from the data service 112 includes events data observed in prior periods up through present day, such as amounts of spending conducted each prior year for a certain amount of years. The retrieval component 205 may package the time series data by periodic intervals, e.g., by two years, five years, ten years, etc. The recommendation tool 109 can use each package of time series as input to the predictive models.

The execution component 210 performs each predictive model using the time series data of previous periods as input. For example, assuming that the current year is 2017, the execution component 210 may provide, as input, time series data corresponding to the years 2007-2012 and specify that the model forecast data for the following five years. The execution component 210 receives the resulting outcomes. Further, the execution component 210 may perform the predictive model on each of the packaged time series data for a more comprehensive view of how the predictive model handles the data. Doing so also minimizes the impact of outliers occurring in the time series data.

The evaluation component 215 scores each predictive model based on the resulting outcomes generated. To do so, the evaluation component 215 may compare retrieved actual time series data corresponding to the time periods reflected in the forecasted outcomes. For example, the evaluation component 215 may perform a root mean square error (RMSE) function using the values in the forecasted outcomes with the actual time series data. Of course, other techniques for scoring may be used, such as by performing a mean absolute error function using the forecasted outcomes and actual time series data.

In one embodiment, the evaluation component 215 may augment predictive model scores based on contextual information associated with the time series data. For example, the evaluation component 215 may determine whether the time series data is associated with events that would generate outliers for a given model, based on the contextual information. For instance, a restructuring of a department might cause a predictive model to generate outcomes for a given period that differ substantially from actual observed time series data. In such a case, the evaluation component 215 may decrease the impact on the score caused by the outlier.

As another example, if time series data for a particular hierarchy was evaluated under a given predictive model in a previous run, the evaluation component 215 may increase the score associated with that model. The evaluation component 215 may also identify, based on domain-specific knowledge associated with a given hierarchy, whether time series data in other hierarchies were evaluated under a given predictive model in a previous run. In such a case, the evaluation component 215 may increase the score associated with that model. Further, the evaluation component 215 may also decrease score associated with that model if the model was shown to not be effective compared to actual results.

The ranking component 220 prioritizes each model based on the scores generated by the evaluation component 215. In one embodiment, a higher score indicates a greater likelihood that the predictive model would be suited to the time series data than a predictive model associated with a lower score.

The output component 225 sends an indication of the ranked predictive models to the predictive modeling application 108. For example, the output component 225 may pass the indication via a function provided by the API of the predictive modeling application 108. In turn, the predictive modeling application 108 performs the highest ranked predictive model using the time series data as input. The output component 225 may generate a notification of the selected predictive model for presentation on the graphical user interface provided by the predictive modeling application 108.

Further, the output component 225 may generate insights related to each of the evaluated predictive models. The insights can include the score associated with the model, values representing the forecasted outcomes generated by the model, contextual information associated with the time series data affecting the model, and the like. The output component 225 may send the insights to the predictive modeling application 108. In turn, the predictive modeling application 108 may present the insights via the graphical user interface.

For example, the predictive modeling application 108, in addition to presenting the selected predictive model, may also present insights associated with the selected model to provide details on how the predictive model was selected. As another example, the predictive modeling application 108 can present each of the unselected predictive models along with the insights associated with each one. Doing so provides the user with an analysis of how the models performed relative to one another and a description of how the highest ranked predictive model was selected. As yet another example, the predictive modeling application 108 may allow the user to either confirm to perform the selected model or make a selection of a model other than the selected model. Providing the user to make a selection of a model can be advantageous in cases where more than one model has a relatively high score.

Figure 3:
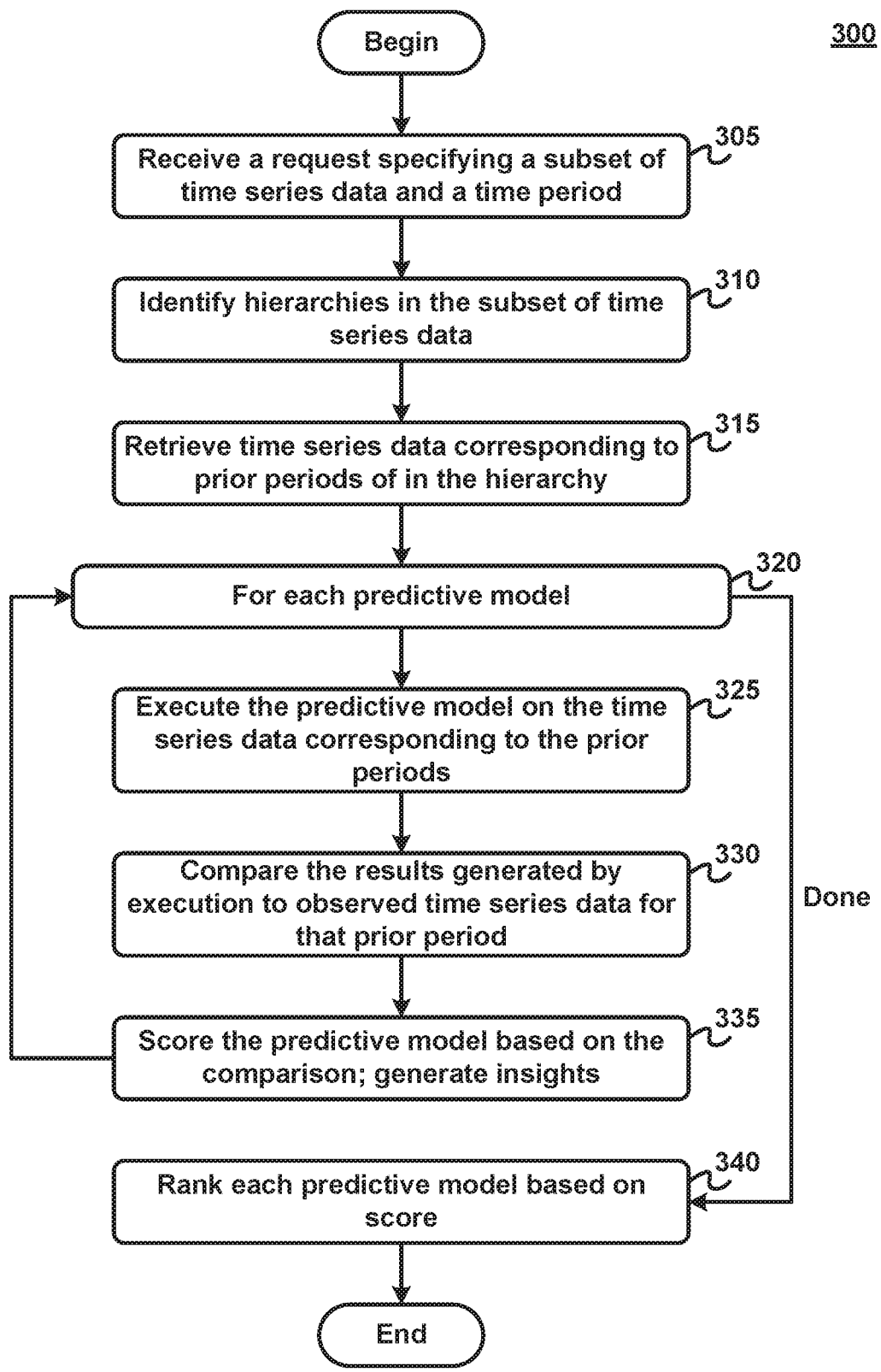
FIG. 3 illustrates a method for selecting a predictive model for a specified set of hierarchical time-series data, according to one embodiment.

FIG. 3 illustrates a method 300 for selecting a predictive model for a specified set of hierarchical time-series data, according to one embodiment. As shown, the method 300 begins at step 305, where the retrieval component 205 receives a request that specifies a set (or subset) of hierarchically-related time series data and an amount of time for projecting forecasted outcomes. For example, the request may ask to forecast expenditures in a "Police Department" fund for the next five years.

At step 310, the retrieval component 205 identifies hierarchies in the requested time series data. The request may include a label specifying "Police Department" or other identifying information for the Police Department, such as an account number or object code typically found in a chart of accounts associated with the underlying municipal government. The retrieval component 205 may identify where the Police Department falls in the hierarchy based on such information.

At step 315, the retrieval component 205 obtains the time series data corresponding to the identified hierarchy. To do so, the retrieval component 205 queries the data service 112 for using the identifying information provided in the request. In turn, the data service 112 uses the identifying information to perform a lookup in the data store 114 to obtain the time series data as well as any metadata associated with the time series data, such as contextual information describing the hierarchy.

At step 320, the method 300 enters a loop for each predictive model provided by the predictive modeling application 108 for steps 325 through 335. At step 325, the execution component 210 performs the predictive model on the time series data. Further, the execution component 210 may perform the predictive model on multiple prior periods of time series to further determine accuracy of the predictive model.

At step 330, the evaluation component 215 compares the results generated by the predictive model to observed time series data for the corresponding period. In this example, the evaluation component 215 may perform an RMSE function over the results provided by the model and the actual observed time series data for the corresponding period. At step 335, the evaluation component 215 scores the predictive model based on the comparison. In the event that the execution component 210 obtains results for multiple periods, the execution component 210 may generate separate scores for each period and perform an average over the scores.

Further, as stated, the evaluation component 215 may also augment the score generated by the model based on contextual data associated with the underlying hierarchy and/or time series data. For instance, the evaluation component 215 may apply domain-specific knowledge associated with the hierarchy to determine whether the predictive model was performed on similar hierarchies with relatively accurate outcomes. Continuing the previous example, the evaluation component 215 may determine that time series data in the Police Department is hierarchically similar to time series data in the Fire Department, and for previous evaluations of the Fire Department, a particular ARIMA-based model has been effective. In such a case, the evaluation component 215 may increase the score for that particular predictive model.

When the method 300 exits the loop (after each predictive model has been evaluated), then at step 340, the ranking component 220 prioritizes the predictive models based on the scores assigned to each. In one embodiment, a predictive model having the highest score may have the highest priority. The output component 225 may notify the predictive modeling application 108 of the highest priority predictive model. Doing so allows the predictive modeling application 108 to select the predictive model for application on the time series data.

Figure 4:
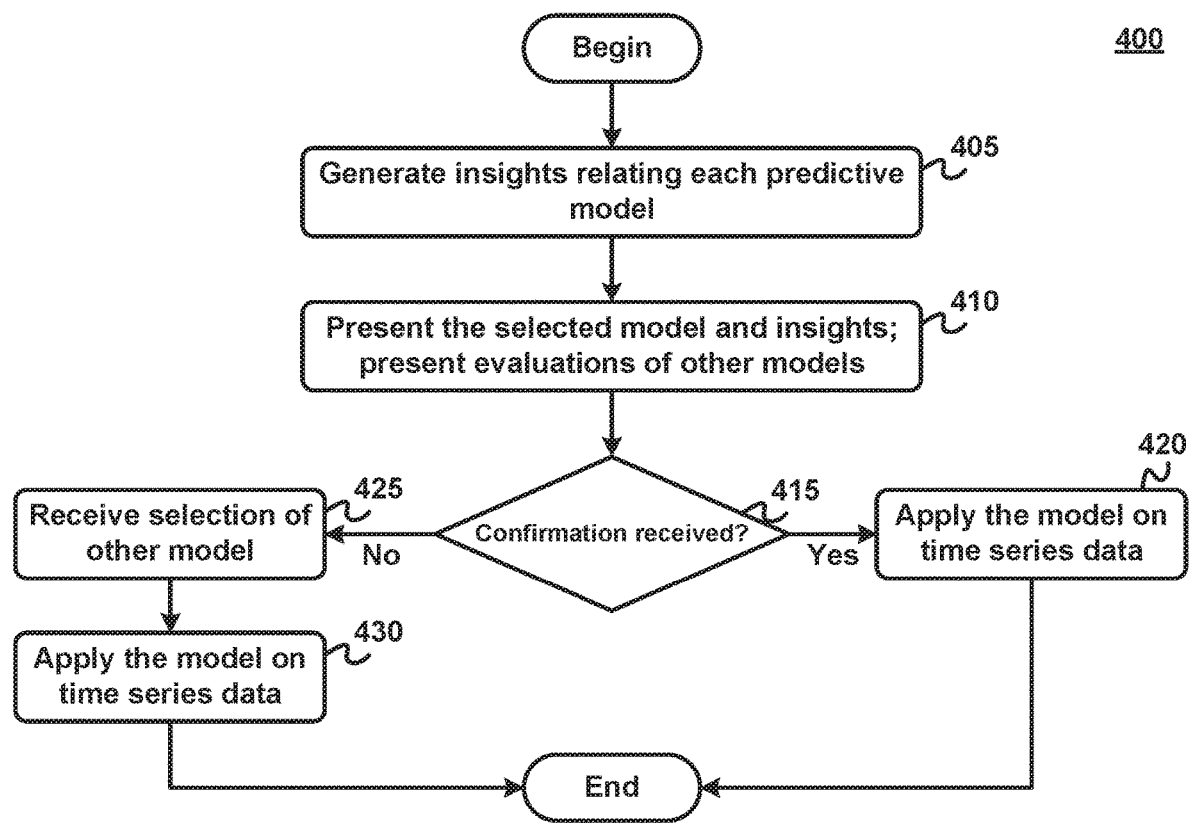
FIG. 4 illustrates a method for applying a predictive model to a specified set of hierarchical data, according to one embodiment.

FIG. 4 illustrates a method 400 for applying a predictive model to a specified set of hierarchical data, according to one embodiment. As shown, the method 400 begins at step 405, where the output component 225 generates insights for each predictive model based on the performance of the model on the prior periods of time series data. To do so, the output component 225 may evaluate the data generated from each model. Using the data, the output component 225 can produce graphs that plot the data generated alongside the actual time series data corresponding to the period forecasted by the model. Further, the output component 225 may obtain a score produced by the evaluation component 225 for each model and store the scores in a file (e.g., an XML file), from which the data can later be retrieved and output by the predictive modeling application 108. Further still, the output component 225 may similarly store contextual information associated with the underlying time series data and/or hierarchy in the file.

At step 410, the predictive modeling application 108 presents the selected predictive model and related insights via the graphical user interface. The predictive modeling application 108 determines the selected predictive model based on the indication provided by the output component 225. Further, the predictive modeling application 108 opens the insights files generated by the output component 225 and extract the stored information from the files. The predictive modeling application 108 may format the insights for the graphical user interface.

Further, the predictive modeling application 108 may prompt, through the graphical user interface, the user for confirmation to perform the selected predictive model. The user may send a confirmation of the selected predictive model or a selection of a predictive model other than the selected one, e.g., through the web browser 117 displaying the graphical user interface.

At step 415, the predictive modeling application 108 determines whether a confirmation was received via the graphical user interface. If so, then at step 420, the predictive modeling application 108 applies the selected predictive model to the time series data corresponding to the request. Otherwise, at step 425, the predictive modeling application 108 receives the selection of another predictive model. At step 430, the predictive modeling application 108 performs the user-selected predictive model to the time series data. In turn, the predictive model may forecast outcomes using the current set of time series data associated with the requested hierarchy. The predictive modeling application 108 may then present the outcomes for view on the graphical user interface.

Figure 5:
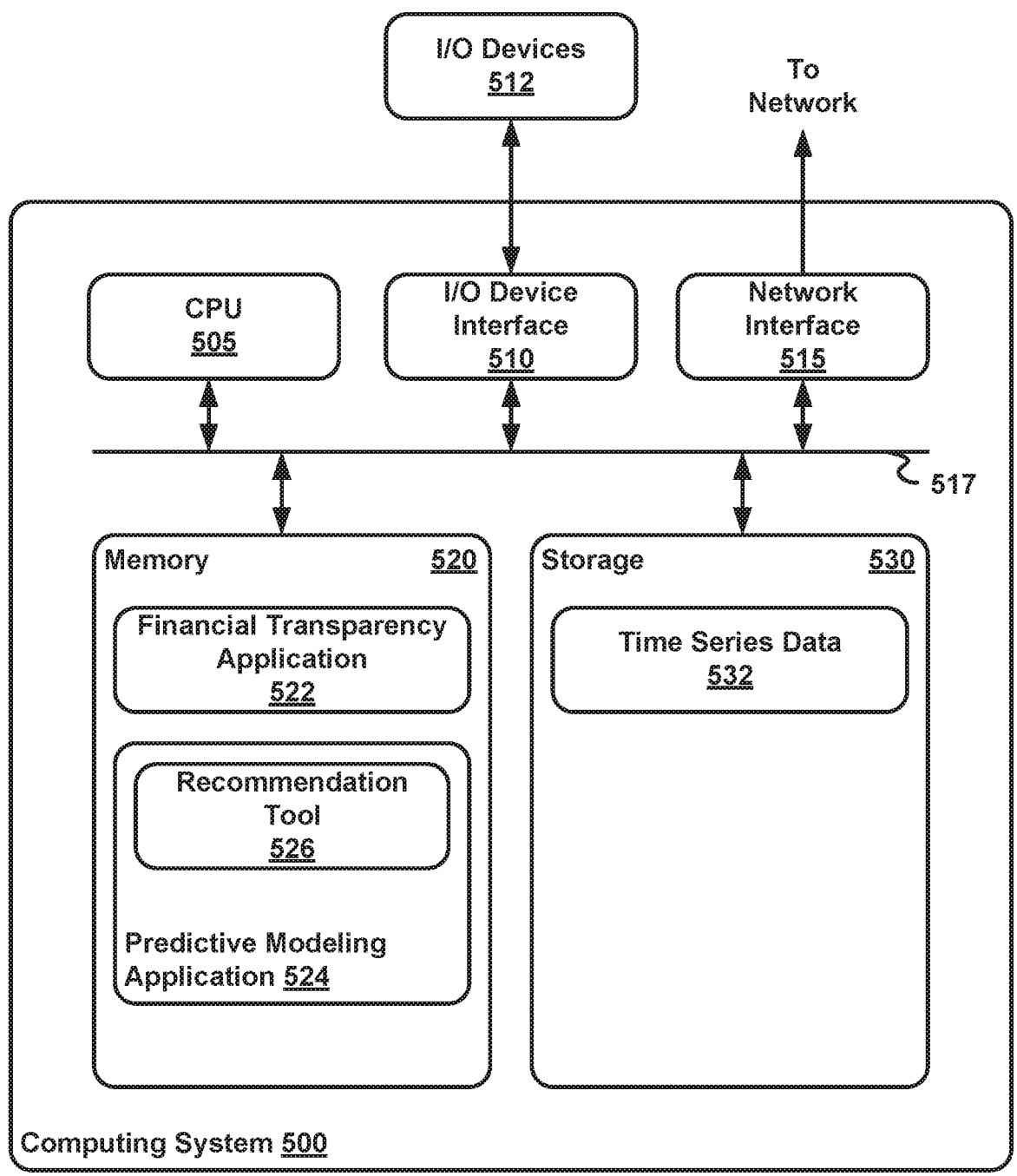
FIG. 5 illustrates an example computer system configured to select a predictive model for a specified set of hierarchical time series data, according to one embodiment.

FIG. 5 illustrates an example computing system 500 configured to select a predictive model for a specified set of hierarchical time series data, according to one embodiment. As shown, the computing system 500 includes, without limitation, a central processing unit (CPU) 505, an I/O device interface 514, which may allow for the connection of various I/O devices 512 (e.g., keyboards, displays, mouse devices, pen input, etc.) to the computing system 500, network interface 515, a memory 520, storage 530, and an interconnect 517.

CPU 505 may retrieve and execute programming instructions stored in the memory 520. Similarly, the CPU 505 may retrieve and store application data residing in the memory 520. The interconnect 517 transmits programming instructions and application data, among the CPU 505, I/O device interface 510, network interface 515, memory 520, and storage 530. CPU 505 is included to be representative of a single CPU, multiple CPUs, a single CPU having multiple processing cores, and the like. Additionally, the memory 520 is included to be representative of a random access memory. Furthermore, the storage 530 may be a solid state or disk drive. Although shown as a single unit, the storage 530 may be a combination of fixed and/or removable storage devices, such as fixed disc drives, removable memory cards or optical storage, network attached storage (NAS), or a storage area-network (SAN). In some cases, computing system 500 may be a single physical system or a distributed system, such as in one or more computer systems or data centers, with processing capabilities, memory 520, and storage 530 distributed across multiple computer systems.

As shown, memory 530 includes a financial transparency application 522 and a predictive modeling application 524. The storage 530 includes time series data 534. The financial transparency application 522 provides views of financial and budgetary data for municipal governments, typically scraped from public sources, such as charts of accounts corresponding to each of the governments. For example, the financial transparency application 522 identifies hierarchies in the budgetary, such as relationships between departments and funds detailed in the charts of accounts. The financial transparency application 522 also identifies time series data 534 in each of the identified hierarchies, such as expenditures occurring at different points in time.

In one embodiment, the predictive modeling application 524 forecasts statistical outcomes of future time periods based on the time series data 534 using a variety of modeling techniques (e.g., exponential models, ARIMA models, etc.). The predictive modeling application 524 includes a recommendation tool 526 used to select an appropriate predictive model for a requested set of hierarchical time series data 534. In particular, the recommendation tool 526 performs each predictive model made available by the predictive modeling application 524 on time series data 534 corresponding to prior periods and comparing the generated outcomes to observed time series data 534 of the corresponding period. The recommendation tool 534 selects the appropriate model based on scores associated with each model, each score generated based on the comparisons. For instance, the recommendation tool 534 may select the predictive model having the highest score associated based on the performance on prior periods of time series data 534 for a given hierarchy.

Note, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present disclosure, other and further embodiments of the disclosure may be devised without departing from the basic scope thereof, and the scope thereof is determined by the claims that follow.

What is claimed is:

1. A method for selecting a predictive model to perform on a set of hierarchical data, the method comprising:
   receiving, via a graphical user interface, a request from a user for a set of forecasted outcomes specifying:
      a first time series data, wherein the first time series data represents activity observed in a current period in a first hierarchy and includes metadata with domain-specific knowledge of the first time series data, and
      an amount of time for projecting the set of forecasted outcomes;
   retrieving a second time series data, wherein the second time series data represents activity observed in at least a prior period of time in the first hierarchy and includes metadata with domain-specific knowledge of the second time series data;
   for each predictive model of a plurality of predictive models:
      generating statistical outcomes using the second time series data as input;
      generating a score for each predictive model of the plurality of predictive models based on a comparison function to compare:
         the statistical outcomes generated using the second time series data as input, and
         actual outcomes in the first hierarchy corresponding to a same amount of time as the amount of time for projecting the set of forecasted outcomes;
   adjusting the generated score for each of the plurality of predictive models based on:
      determining based on the metadata with domain-specific knowledge of the second time series data:
         a third time series data in a second hierarchy that was previously evaluated by the predictive model; and
         effectiveness of the predictive model in generating a score for the third time series data in the second hierarchy;
   ranking each predictive model of the plurality of predictive models based on the adjusted score for each of the plurality of predictive models;
   generating a set of graphs indicating how each predictive model of the plurality of predictive models performed relative to one another, wherein each graph corresponds to a predictive model of the plurality of predictive models;
   selecting a predictive model from the ranking of the plurality of predictive models that has a highest score;
   presenting the selected predictive model and a corresponding graph from the set of graphs via the graphical user interface;
   receiving confirmation from the user via the graphical user interface to perform the selected predictive model;
   applying the selected predictive model to the first time series data; and
   generating the set of forecasted outcomes based on the selected predictive model with the first time series data.

2. The method of claim 1, wherein the first time series data includes contextual information describing the first hierarchy.

3. The method of claim 2, further comprising: augmenting the score in each predictive model of the plurality of predictive models based on the contextual information.

4. The method of claim 2, wherein the contextual information describes a performance of one of the plurality of predictive models relative to the second hierarchy.

5. The method of claim 4, further comprising: augmenting the score of the one of the plurality of predictive models based on the contextual information.

6. A computer-readable storage medium storing instructions, which, when executed on one or more processors, performs an operation for selecting a predictive model to perform on a set of hierarchical data, the operation comprising:
receiving, via a graphical user interface, a request from a user for a set of forecasted outcomes specifying:
a first time series data, wherein the first time series data represents activity observed in a current period in a first hierarchy and includes metadata with domain-specific knowledge of the first time series data, and
an amount of time for projecting the set of forecasted outcomes;
retrieving a second time series data, wherein the second time series data represents activity observed in at least a prior period of time in the first hierarchy and includes metadata with domain-specific knowledge of the second time series data;
for each predictive model of a plurality of predictive models:
generating statistical outcomes using the second time series data as input;
generating a score for each predictive model of the plurality of predictive models based on a comparison function to compare:
the statistical outcomes generated using the second time series data as input, and
actual outcomes in the first hierarchy corresponding to a same amount of time as the amount of time for projecting the set of forecasted outcomes;
adjusting the generated score for each of the plurality of predictive models based on:
determining based on the metadata with domain-specific knowledge of the second time series data:
a third time series data in a second hierarchy that was previously evaluated by the predictive model; and
effectiveness of the predictive model in generating a score for the third time series data in the second hierarchy;
ranking each predictive model of the plurality of predictive models based on the adjusted score for each of the plurality of predictive models;
generating a set of graphs indicating how each predictive model of the plurality of predictive models performed relative to one another, wherein each graph corresponds to a predictive model of the plurality of predictive models;
selecting a predictive model from the ranking of the plurality of predictive models that has a highest score;
presenting the selected predictive model and a corresponding graph from the set of graphs via the graphical user interface;
receiving confirmation from the user via the graphical user interface to perform the selected predictive model;
applying the selected predictive model to the first time series data; and
generating the set of forecasted outcomes based on the selected predictive model with the first time series data.

7. The computer-readable storage medium of claim 6, wherein the first time series data includes contextual information describing the first hierarchy.

8. The computer-readable storage medium of claim 7, wherein the operation further comprises: augmenting the score in each predictive model of the plurality of predictive models based on the contextual information.

9. The computer-readable storage medium of claim 7, wherein the contextual information describes a performance of one of the plurality of predictive models relative to the second hierarchy.

10. The computer-readable storage medium of claim 9, wherein the operation further comprises: augmenting the score of the one of the plurality of predictive models based on the contextual information.

11. A system, comprising:
one or more processors; and
a memory storing program code, which, when executed on the one or more processors, performs an operation for selecting a predictive model to perform on a set of hierarchical data, the operation comprising:
receiving, via a graphical user interface, a request from a user for a set of forecasted outcomes specifying:
a first time series data, wherein the first time series data represents activity observed in a current period in a first hierarchy and includes metadata with domain-specific knowledge of the first time series data, and
an amount of time for projecting the set of forecasted outcomes;
retrieving a second time series data, wherein the second time series data represents activity observed in at least a prior period of time in the first hierarchy and includes metadata with domain-specific knowledge of the second time series data,
for each predictive model of a plurality of predictive models:
generating statistical outcomes using the second time series data as input,
generating a score for each predictive model of the plurality of predictive models based on a comparison function to compare:
the statistical outcomes generated using the second time series data as input, and
actual outcomes in the first hierarchy corresponding to a same amount of time as the amount of time for projecting the set of forecasted outcomes;
adjusting the generated score for each of the plurality of predictive models based on:
determining based on the metadata with domain-specific knowledge of the second time series data:
a third time series data in a second hierarchy that was previously evaluated by the predictive model; and
effectiveness of the predictive model in generating a score for the third time series data in the second hierarchy;
ranking each predictive model of the plurality of predictive models based on the adjusted score for each of the plurality of predictive models;
generating a set of graphs indicating how each predictive model of the plurality of predictive models performed relative to one another, wherein each graph corresponds to a predictive model of the plurality of predictive models;

selecting a predictive model from the ranking of the plurality of predictive models that has a highest score;

presenting the selected predictive model and a corresponding graph from the set of graphs via the graphical user interface;

receiving confirmation from the user via the graphical user interface to perform the selected predictive model;

applying the selected predictive model to the first time series data; and generating the set of forecasted outcomes based on the selected predictive model with the first time series data.

12. The system of claim 11, wherein the first time series data includes contextual information describing the first hierarchy.

13. The system of claim 12, wherein the operation further comprises:

augmenting the score in each predictive model of the plurality of predictive models based on the contextual information.

14. The system of claim 12, wherein the contextual information describes a performance of one of the plurality of predictive models relative to the second hierarchy.

15. The system of claim 14, wherein the operation further comprises: augmenting the score of the one of the plurality of predictive models based on the contextual information.

16. The method of claim 1, wherein the method further comprises:

determining a periodic time interval; and generating a package of time series data based on the periodic time interval for the second time series data.

17. The method of claim 16, wherein the method further comprises:

inputting each package of time series data to each predictive model of the plurality of predictive models.

18. The computer-readable storage medium of claim 6, wherein the operation comprises:

determining a periodic time interval; and generating a package of time series data based on the periodic time interval for the second time series data.

19. The computer-readable storage medium of claim 18, wherein the operation comprises: inputting each package of time series data to each predictive model of the plurality of predictive models.

20. The system of claim 11, wherein the operation comprises:

determining a periodic time interval; and generating a package of time series data based on the periodic time interval for the second time series data to input into each predictive model of the plurality of predictive models.

* * * * *